Patented Jan. 4, 1949

2,457,917

UNITED STATES PATENT OFFICE 2,457,917

PURIFICATION OF TITANIUM HALIDES BY TREATMENT WITH METAL HYDRIDES AND DISTILLATION

Douglas Gillison Nicholson, Pittsburgh, Pa.

No Drawing. Application September 23, 1947, Serial No. 775,745

9 Claims. (Cl. 202—57)

1

This invention relates to the purification of titanium tetrahalides and more particularly to the purification and decolorization of impure and discolored titanium tetrachloride.

Titanium tetrahalides have become important industrial raw materials for use where pure titanium materials are produced. The titanium pigment industry utilizes titanium tetrachloride for preparing "seed" which is added in the solution hydrolysis method of manufacture. This "seed" material is an important factor in the process because of its controlling effect upon the resulting pigment crystal form, size and quality. In a newer process of titanium pigment manufacture, a vaporous titanium halide, preferably $TiCl_4$, is oxidized by an oxygen-containing gas to produce solid $TiO_2$ particles suspended in the halogen-containing product gases. The solid $TiO_2$ is separated out and treated for various pigment uses. It is especially important to the quality of the final pigment product that the titanium tetrahalide in either process be highly pure. For instance, if various coloring impurities are present when the titanium tetrachloride is oxidized, a brown, discolored $TiO_2$ results which is practically useless as a pigment.

Pure ductile titanium has been produced by the reduction of titanium tetrachloride with magnesium. The product of this promising development has excellent physical and chemical properties and many potential uses. The basic properties such as ductility depend upon the purity of the metal, which in turn depends also on the raw material and the methods used in its preparation.

These significant developments result because of the purity of the raw material which is obtained commercially first in a very crude and impure state. The titanium halides used for the preparation of titanium oxide pigments and for other purposes are generally prepared by reacting a titaniferous ore with the halogen gas in the presence of a reducing agent. The desired titanium halide is thus formed, but in addition, certain impurities such as halides or oxyhalides of Fe, Zr, Si, V, Cr, Al and C, which are present in such ores and reducing agents, are similarly produced. The final product then is a mixture of titanium tetrahalide with a minor but disadvantageous quantity of contaminating halides and oxyhalides. The removal of these contaminants presents a difficult problem in industrial production, especially because of the high purity desired, i. e. impurity contents measured only in parts per million, and the complexity of the starting material.

2

Purification of such titanium halides has been effected by various methods. Processes involving the tetrachloride have been most intensively studied. The product from the chlorination of a titaniferous ore usually consists of a liquid phase comprising the titanium tetrachloride with soluble impurities and solid phases of undissolved materials. A preliminary separation may be made between the liquid and solids by filtration or decantation. This produces a "crude" titanium tetrachloride having soluble impurities and usually containing also some finely divided dispersed solids. A further operation in which this crude material is fractionated by distillation separates it into three fractions; (1) the low boiling fraction consisting mostly of $SiCl_4$ and $CCl_4$ with non-condensibles such as $Cl_2$, $HCl$ and $COCl_2$; (2) the "predistilled" titanium tetrachloride fraction; and (3) the high boiling tails such as iron, zirconium and chromium chlorides and oxychlorides and the like, which are retained as a sludge in the still pot. The "predistilled" titanium tetrachloride, a yellow to orange liquid, contains impurities in amounts which are entirely too great for the intended uses. This is particularly true of the vanadium chloride content. Spectrophotometric studies indicate that vanadium remains in the $TiCl_4$ probably as $VOCl_3$, which form is not easily acted upon by known methods of purification. It is often this vanadium which causes the yellowish color of the liquid $TiCl_4$, which in its commercially useful state should be completely water-white and clear. Several methods are in use or have been proposed to effect removal of this manadium and decolorization of the $TiCl_4$. Adsorption by silica gel, clay and other such materials has been tried. Closely controlled fractionation is also possible, but the difference in boiling point and volatility between $TiCl_4$ (B. P. 136.5° C.) and $VOCl_3$ (B. P. 127.2° C.) is slight, and the purity requirement so strict that the operation is rendered commercially impractical.

It is accordingly among the objects of this invention to overcome the difficulties heretofore found in attempting to purify titanium tetrahalides. A further object is to decolorize the said halides and remove vanadium and other metal impurities therefrom by a relatively more simple and inexpensive process than has heretofore been possible. A particular object is to purify titanium tetrachloride and to obtain it as a clear, substantially colorless material. Another object is to prepare titanium tetrahalides, especially the chloride, of such purity that they may subsequently be hydrolyzed to make pigment "seed," oxidized to produce high grade titanium oxide pigments, or reduced to form ductile titanium metal.

These and other objects are realized by the following invention which broadly comprises effecting the purification and decolorization of a titanium tetrahalide by contacting the same with a "salt-like" metal hydride.

A more specific adaptation of the invention embodies the decolorization of impure anhydrous titanium tetrachloride, containing vanadium and other difficultly separable materials, by heating the said $TiCl_4$ in the presence of a "salt-like" metal hydride, and subsequently distilling off and collecting the thus-purified $TiCl_4$.

The so-called "salt-like" hydrides are those compounds of certain metals with hydrogen wherein the bond is electrovalent. In other words, the outer electron (or electrons) of the metal is donated to the hydrogen atom or atoms, the two being held together by electrostatic forces. In this class of hydrides the hydrogen exists as a negative ion and can be electrolyzed therefrom at the positive electrode. These hydrides are formed by direct combination of the elements to produce, when pure, white crystalline solids. The commercial grades of these hydrides are usually gray in color because of impurities. They are termed "salt-like" because the alkali metal hydride crystals exhibit the sodium chloride lattice. Examples of this class are the alkali metal hydrides ($LiH$, $NaH$, $KH$, etc.), certain alkaline earth hydrides ($CaH_2$, $SrH_2$, $BaH_2$), and the like which exhibit similar chemical reactivity. The class is thus distinguished from the other well known hydrides: the volatile hydrides wherein the bond between the elements is covalent, and the interstitial hydrides which are actually not compounds but rather solid solutions or alloys of atomic hydrogen in the metal.

The impure titanium tetrahalide should be subjected to heat during its period of intimate association with the hydride, and is preferably distilled over a mass of the solid hydride. Preferably, too, the material is refluxed at least partially during distillation to allow intimate contact between the halide and the purifying agent. The time and temperature of such contact are necessarily interdependent with the quantity of purifying agent, its surface activity, or in other words its degree of comminution, and the amount of contamination of the crude halide. It is generally true that simple distillation with partial reflux over from .1% to 10% of the metal hydride, by weight of the halide, will satisfactorily purify $TiCl_4$ made from most commerical titanium ores; and usually from .5% to 5% of the hydride will be sufficient. Naturally, the greater the quantity of metal hydride used and the smaller its particles (so that a large surface area is exposed), the more rapid the action, within practical limits. When the agents and the titanium halide have been commingled for a sufficient period of time to effect the decolorization, the tetrahalide may be completely separated out by simple distillation with less, or even no reflux, leaving behind the metal hydride and the vanadium and other impurities. The metal hydride and reaction products may subsequently be reworked and valuable components recovered.

The apparatus in which the contact is effected may be chosen at the will of the operator, and also depends in part on the refluxing conditions, the time of contact, the quantity of purifying agent, and other factors. Essentially any apparatus known to the art may be employed, ranging from a simple glass flask to complex refluxing and distillation equipment. If desired, silicon tetrachloride, chlorine, and such low boiling compounds may be removed simultaneously with the vanadium by combining fractional distillation with the present operation.

The following examples are given simply to illustrate my invention, and not in any way to limit the comprehensiveness of the claims following hereinafter:

Example I

Crude $TiCl_4$ was prepared by conventional chlorination of ilmenite ore. It was first subjected to fractional distillation to remove most of the high and low boiling fractions, such as iron, silicon, zirconium chlorides and free chlorine. This "predistilled $TiCl_4$" was yellow in color.

86 parts by weight of this material were placed in a distillation flask fitted with a reflux condenser. To the liquid were added three parts by weight of 10-mesh technical calcium hydride (approximately 50% $CaH_2$). The mixture was heated to allow distillation with partial refluxing. A sample of distillate obtained after ½ hour of heating was clear and water-white. The residue in the distillation flask was brownish in color.

Example II

One part by weight of 5-mesh lithium hydride was added to 86 parts by weight of the predistilled $TiCl_4$ of Example I, again using a glass distillation flask equipped for refluxing. Distillation was again effected by heating the mixture, and the reaction was continued for one hour. At the end of that time, the distilled $TiCl_4$, which had been collected and condensed by a conventional air condenser, was water-white and completely clear. The residue was a brownish-purple in color.

Example III

The procedure of the previous examples was again employed, but using 30-mesh powdered sodium hydride in the proportions of one part by weight to 30 parts by weight of $TiCl_4$. A sample of distillate obtained at the end of 5 minutes' heating was substantially lighter in color than the crude $TiCl_4$.

It is necessary in my process that all moisture be excluded from the system. $TiCl_4$ hydrolyzes readily in the presence of water. Furthermore, water reacts easily with the hydrides to liberate hydrogen and the corresponding metal hydroxides.

The above examples have shown treatment of liquid titanium halides with the metal hydrides. However, it is equally possible, and sometimes preferred, to vaporize the crude halide first and to pass the vapors over a contact mass of the said hydride. In so doing, however, care should be taken that the vapors be not superheated to a temperature at which the hydride itself would become reactive. Additionally, the above examples have been drawn primarily to treatment of titanium tetrachloride. However, it is obvious that my invention is also applicable to the treatment of other titanium halides, including the bromides, iodides, and fluorides. Since the chloride is most commonly used in industry, it is generally more important.

By the phrase "salt-like hydrides" in the appended claims, I mean those metal hydrides which are solid crystalline compounds wherein the metal-to-hydrogen bond is electrovalent. The reason for the action of such hydrides in purifying and decolorizing the titanium halides is not known. It may be that vanadium and other impurities are reduced to less volatile forms, or it may be that some adsorption takes place, or it may be that some other unknown phenomenon is responsible. Whatever the theoretical explanation, however, the practical result is that the titanium halides of commerce, particularly $TiCl_4$, can now be purified by an efficient and relatively simple technique.

I claim:

1. A method for purifying a titanium tetrahalide which comprises intimately associating said halide with a salt-like metal hydride, at an elevated temperature.

2. A method for removing impurities from a titanium tetrahalide which comprises heating said halide in the presence of a salt-like metal hydride and distilling off said tetrahalide.

3. A method for purifying a titanium tetrahalide which comprises heating said halide in the presence of an alkali metal hydride, and distilling said halide therefrom.

4. A method for purifying a titanium tetrahalide which comprises heating said halide in the presence of a hydride of an alkaline earth metal selected from the group consisting of calcium, barium, and strontium, and distilling said halide therefrom.

5. A method for purifying discolored and impure titanium tetrachloride which comprises heating said chloride at its vaporization temperature and comingling said chloride with salt-like metal hydride.

6. A method for removing vanadium from titanium tetrachloride contaminated thereby which comprises distilling said chloride over a salt-like metal hydride.

7. A method for removing vanadium from titanium tetrabromide contaminated thereby which comprises distilling said bromide over a salt-like metal hydride.

8. A method for removing vanadium from titanium tetraiodide contaminated thereby which comprises distilling said iodide over a salt-like metal hydride.

9. A method for decolorizing liquid titanium tetrachloride containing vanadium as an impurity which comprises contacting said chloride with from 0.1% to 10% by its weight of a salt-like metal hydride and distilling off the said chloride.

DOUGLAS GILLISON NICHOLSON.

No references cited.